March 23, 1943.   L. A. BEATTY   2,314,681
BEET TOPPER AND DIGGER
Filed Feb. 16, 1942   3 Sheets-Sheet 1

LESTER A. BEATTY,
INVENTOR.

BY
ATTORNEY

March 23, 1943.   L. A. BEATTY   2,314,681
BEET TOPPER AND DIGGER
Filed Feb. 16, 1942   3 Sheets-Sheet 2
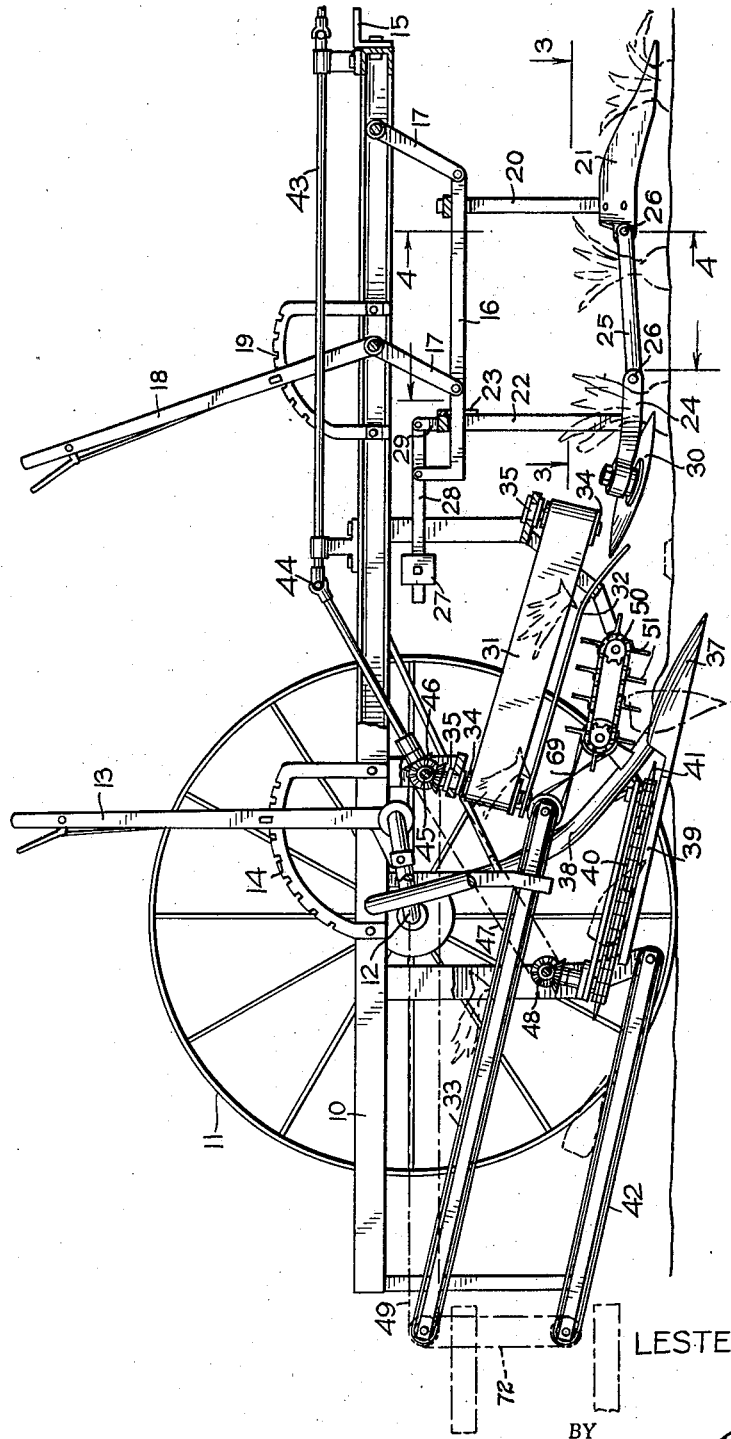
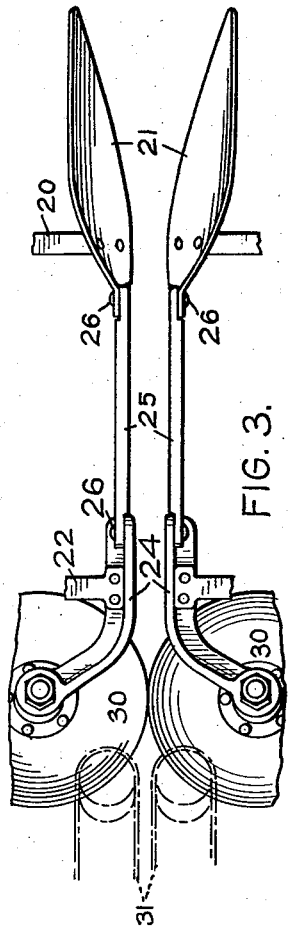
FIG. 3.
FIG. 2.
LESTER A. BEATTY,
INVENTOR.

March 23, 1943.    L. A. BEATTY    2,314,681
BEET TOPPER AND DIGGER
Filed Feb. 16, 1942    3 Sheets-Sheet 3

LESTER A. BEATTY,
INVENTOR.

BY *[signature]*
ATTORNEY

Patented Mar. 23, 1943

2,314,681

UNITED STATES PATENT OFFICE 2,314,681

BEET TOPPER AND DIGGER

Lester A. Beatty, Keenesburg, Colo.

Application February 16, 1942, Serial No. 431,006

11 Claims. (Cl. 55—107)

This invention relates to a sugar beet harvester and has for its principal object the provision of a simple and highly efficient device which will remove the tops from the beets while the latter are still in the ground and which will automatically regulate the height of the topping knives in accordance with the amount of projection of the beet from the ground and in proportion to the size of the beet.

Other objects are: to provide efficient means for lifting and gathering the topped beets from the ground and elevating them to any desired point; to provide means to separate the severed tops from the beet and gather and elevate them independently thereof; to provide a machine of this character which can be connected direct to a tractor and which will not require an operator in addition to the usual tractor driver; and to provide an automatic control for the topping knives which will cause the knives to cut a greater depth of crown from the beets having the greatest amount of foliage. The latter object is necessary due to the fact that in large foliage beets the stems extend further down on the sides of the beet crowns so that a deeper cut is necessary to remove all of the top.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 2 is a partial side view and partial longitudinal section thereof, taken on the line 2—2, Fig. 1;

Fig. 3 is a fragmentary top view of the topping mechanism employed in the form of Fig. 1; this view is taken on the line 3—3, Fig. 2;

Figure 1:
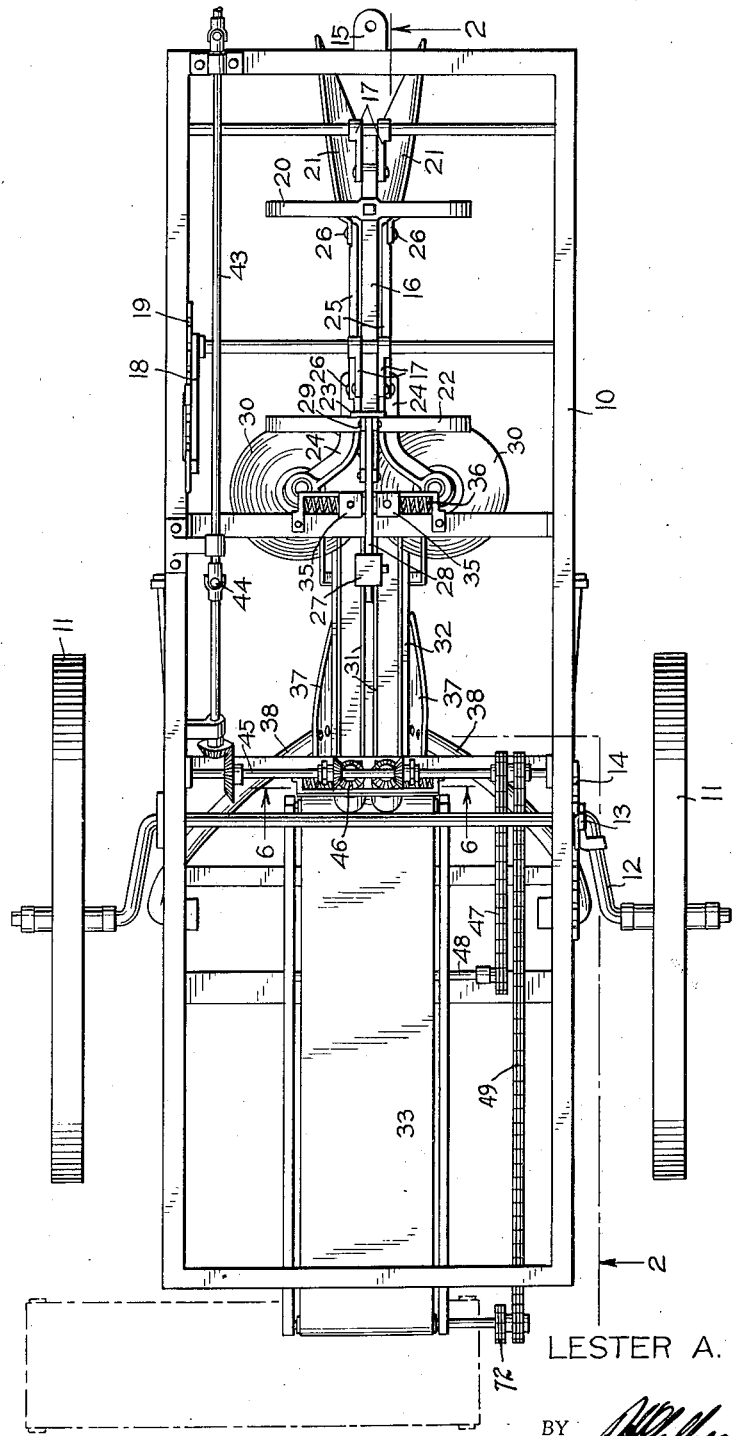
Fig. 1 is a plan view of a simple form of the improved beet harvester.
Figure 8:
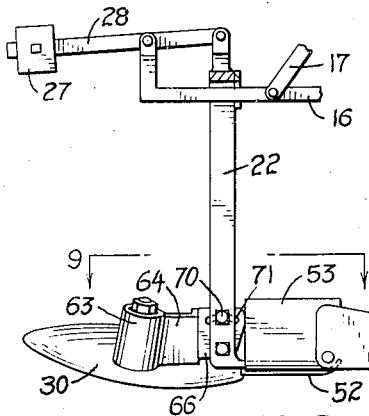
Fig. 8 is a longitudinal section, taken on the line 8—8, Fig. 7.
Figure 7:
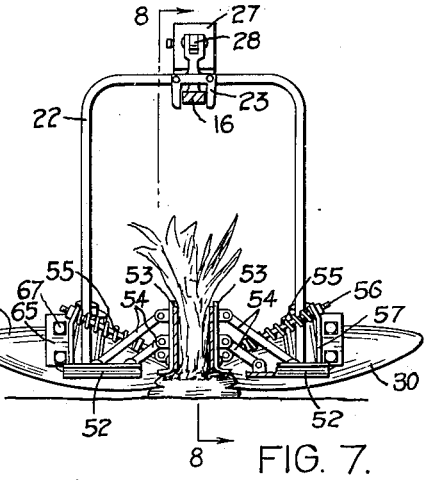
Fig. 7 illustrates a gauging device which may be applied to the rear arch member for proportioning the depth of cut to the amount of foliage on the beets.
Figure 9:
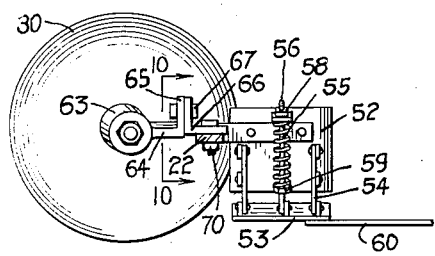
Fig. 9 is a detail, horizontal section, taken on the line 9—9, Fig. 8.
Figures 10, 11:
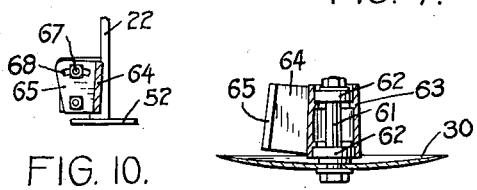
Fig. 10 is a detail section through the knife supporting bracket, taken on the line 10—10, Fig. 9.
Fig. 11 is a detail section illustrating the type of knife bearing employed in the improved harvester.
Figure 5:
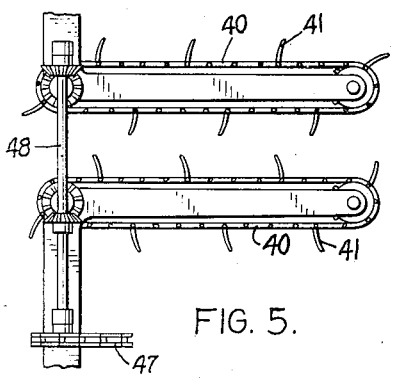
Fig. 5 is a detail view of the beet drag chains employed in the harvester.

The improved harvester employes a frame 10 supported from suitable ground engaging wheels 11 which are preferably mounted on a crank axle 12 which can be rotated through the medium of an axle lever 13 to raise and lower the frame 10. The axle lever 13 can be preset in any desired position through the medium of a locking sector 14. The forward extremity of the frame 10 terminates in a tongue member 15 for attachment to the draw bar of a typical tractor. It may, however, be attached to the tractor in any desired manner.

A longitudinally extending suspension bar 16 is suspended below the frame 10 upon swingingly mounted parallel links 17, so that when the links are swung rearwardly, the bar 16 will be elevated and when swung forwardly will be depressed, always maintaining a horizontal position or a position parallel to the frame 10. The links 17 may be manually swung to raise and lower the bar 16, by means of an adjusting lever 18 provided with a suitable locking sector 19.

Figure 4:
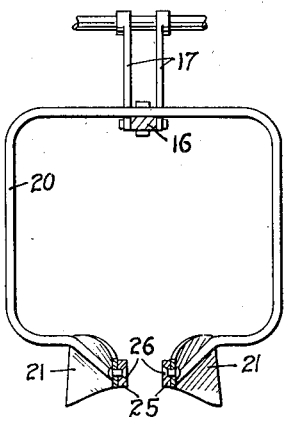
Fig. 4 is a detail section, taken on the line 4—4, Fig. 2, illustrating the forward arch member employed in the improved harvester.
Figure 6:
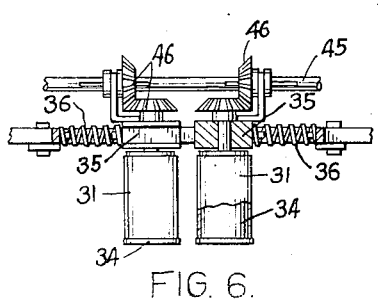
Fig. 6 is a fragmentary, detail view illustrating the bearing supports for the rollers of the top gathering belts.

A forward arch member 20 is fixedly secured to, and extends transversely of, the suspension bar 16 adjacent its forward extremity and depends downwardly therefrom terminating in top lifting scoops 21, as shown in Fig. 4.

The scoops 21 are inclined outwardly from each other and extend forwardly and downwardly from the extremities of the arch member for the purpose of passing under and lifting the beet stalks and leaves at each side of the beet row.

A rearward arch member 22 extends over the suspension bar 16 adjacent its rearward extremity. This rearward arch member is free to rise and fall with reference to the suspension bar, its vertical movements being guided by means of guide fingers 23 depending downwardly from the arch member. The lower extremities of the legs of the rearward arch member are connected to runners 24 which ride on the crowns of the beets. Each of the scoops 21 is flexibly connected to one of the runners 24 by means of a hinged connecting link 25. The links 25 are hinged to the scoops and to the runners upon suitable hinge pins 26.

It can be readily seen that if the device is drawn along a row of beets, the scoops 21 will lift the foliage and travel along the opposite sides of the beets in the row. The scoops guide the forward extremities of the links 25 over the tops of the beets at each side of the stalks thereof. Since the links are hinged to the scoops 21 at their forward extremities they are free to swing upwardly and downwardly at their rearward extremities in accordance with the heights of the beets passing thereunder. The upward and downward movements of the rear extremities of the links 25 will be communicated to the runners 24 to raise and lower them in accordance with the height of the beet so that each beet will slide beneath and temporarily support the runners 24.

Since the runners are fixed to the rearward arch member 22, the latter must also rise and fall with the vertical movements of the runners. The weight of the arch member 22 and its connected mechanism is partially counterbalanced by means of a counter-weight 27. The counter-weight 27 is mounted on a counter-weight lever 28 pivoted on the rearward extremity of the suspension bar 16. The forward extremity of the weight lever is connected in any suitable manner, such as by means of a link 29 to the rearward arch member 22. The counter-weight 27 is adjustable on the lever 28 so that it can be positioned to absorb the major portion of the weight of the rearward arch member 22 and its connected mechanism so that the beets will be required to lift but a minimum of weight in swinging the links 25 upwardly.

A freely rotatable disc knife 30 is journalled at the rearward extremity of each runner 24. These two knives slightly overlap each other at the center line between the runners 24. The knives are drawn against the opposite sides of each beet as it passes under the runners to sever the top therefrom. Since the knives are carried by the runners they rise and fall in accordance with the height of the successive beets to cut the crown therefrom at the proper depth regardless of the amount the beet projects from the ground.

The foliage of the severed beet tops is immediately grasped between two endless gripping belts 31 which are rotated rearwardly at their adjacent faces. These belts drag the severed tops upwardly along an inclined plate 32 from whence they fall upon a suitable top elevator 33 which carries them rearwardly and upwardly and deposits them wherever desired. The belts 31 are mounted on belt pulleys 34 which are journalled in sliding bearings 35. The bearings are constantly urged toward each other by means of compression springs 36 to cause the belts to grip the opposite sides of the cut tops.

A pair of beet lifting plows 37, mounted on suitable plow beams 38, is positioned immediately behind the knives 30. These plows may be of any standard design for lifting the beets from the ground. The lifted beets fall on inclined bars 39 and are dragged upwardly therealong by means of a pair of opposed drag chains 40 having suitable beet engaging claws 41. The beets fall from the upward extremities of the bars 39 upon a suitable beet elevator 42 which carries them upwardly and rearwardly to any desired point. An endless conveyor 50 having suitable paddles 51 is mounted above the plows 37. The paddles engage the beets as they are elevated by the plows and sweep them rearwardly between the chains 40.

The depth of the plows 37 can be regulated by operation of the axle lever 13 and the vertical position of the scoops 21 can be regulated by the adjusting lever 18. The vertical position of the knives 30 is automatically regulated by the height of the beets. The knives 30 may be power driven if desired or they may be simply rotated by their frictional contact with the beets.

Power for driving the various belts, chains, and elevators is derived from the power take-off of the tractor through the medium of a power shaft 43 which is connected through suitable universal joints 44 with a cross shaft 45. The cross shaft carries bevel gears 46 for driving the belt pulleys 34 and with suitable chain sprockets for driving a first transmission chain 47 which in turn drives a counter-shaft 48 furnishing the power for driving the beet gathering chains 40. A second transmission chain 49 extends from a suitable chain sprocket on the shaft 45 to drive the top elevators 33 and the sweep conveyor 50. The latter may be driven in any desired manner such as by means of a cross belt 69 extending from the top elevator 33.

The above described mechanism has been found highly efficient in a beet field having relatively uniformly sized beets and tops. Occasions may arise in which some of the beets in a field or a row have unusually large foliage while others in the same field or row will have average or below average foliage or tops. On the beets with abundant foliage, some of the stalks or leaves will sprout from the top below the apex or crown thereof. For such conditions, it is desirable to provide an automatic gauge device which will cause the knives to cut more crown from the beets with heavy foliage than from the beets with less foliage. Such a gauge device is illustrated in Figs. 7 to 11 of the drawings, designed for attachment to the legs of the rear arch member 22 of the improved harvester.

The gauge device employs two runner plates 52 which will slide over the surface of the ground unless elevated by the beets in a row. Each runner plate 52 is fixed on the lower extremity of one of the legs of the rear arch member 22. Each runner plate supports a vertical gauge plate 53 and is connected therewith by means of four links 54. The links are hingedly connected at their extremities to the plates 52 and 53, respectively, and are of such respective lengths that when the gauge plates 53 are in their innermost positions they will be substantially vertical and parallel but as these plates separate from each other they will swing away from each other more rapidly at the bottom than at the top. This is accomplished by having the uppermost links 54 of greater length than the lowermost links 54 at each plate.

The two gauge plates are rounded outwardly at their lower edges to engage and ride on the crowns of the beets. They are constantly urged toward each other by means of suitable compression springs 55, there being one spring for each gauge plate 53. The springs are mounted on spring rods 56, one of which extends from the bottom of each gauge plate upwardly and outwardly through a spring bracket member 57 which is secured to and extends upwardly from adjacent the outer edge of each runner plate. The spring rods carry outer nuts 58, by means of which the approaching limit of movement of the gauge plates may be regulated, and inner nuts 59, by means of which the reaction or compression in the springs 55 may be regulated.

Each gauge plate is hingedly secured on the rear extremity of a guide member 60 which extends forwardly therefrom to a hinged connection with one of the top lifting scoops 21 similarly to the links 25 of the previously described form.

The disc knives are similar to the knives of the preceding form. In both forms they are secured on knife shafts 61 which are journalled in frictionless bearings 62 in a tubular bearing housing 63. A supporting ear 64 projects from each bearing housing. This ear terminates in an angle flange 65 which is bolted to an angle clip 66 by means of suitable bolts 67. One of the latter bolts extends through a slotted hole 68 in the angle flange to allow the knife to be adjusted through a lateral arc before the bolts are tightened. The angle clip 66 is in turn secured to a leg of the rear arch member 22 by means of suitable clamp bolts 70, one of which extends through a slotted hole in the clip to allow the knife to be adjusted through a longitudinal arc before setting.

In use, the scoops 21 guide the guide member 60 over the successive beets at each side of the stalks thereof. The guide members raise or lower the vertical gauge plates 53 and direct them onto the crowns of the beets to support the rear arch member 22 and its connected mechanism.

Let us assume that a beet with a large or full top foliage is encountered. This foliage in crowding between the guide members 60 and the gauge plates 53 forces the latter apart against the resistance of the springs 55. The gauge plates 53 cannot move upwardly since they are supporting all of the rear arch mechanism. The runner plates 52 cannot move outwardly since they are fixed to the legs of the rear arch member. The only reaction remaining for the links 54 therefore is to force the runner plates 52 downward which, of course, lowers the cutting plane of the knives for that particular beet to cut a relatively deep crown therefrom. Should a beet with a light top pass through, there will be but little separation of the gauge plates and but little lowering of the knives so that a shallow top will be cut therefrom.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A beet topping device for beet harvesters comprising: a pair of vertically adjustable, spaced-apart, foliage-lifting members for lifting the foliage at each side of the beets; a link member hinged to each foliage-lifting member and extending rearwardly therefrom; a beet engaging runner hinged to the rear extremity of each of said link members, said runners being free to rise and fall in accord with the height of the beets in the ground; and coacting topping knives carried by said runners and positioned to top the beets passing therebetween.

2. A beet topping device for beet harvesters comprising: a pair of vertically adjustable, spaced-apart scoops for lifting the foliage at each side of the beets; a link member hinged to each scoop and extending rearwardly therefrom; a beet engaging runner hinged to the rear extremity of each of said links, said runners being free to rise and fall in accord with the height of the beets in the ground; coacting topping knives carried by said runners and positioned to top the beets passing therebetween; and a pair of coacting, longitudinally extending, clamping belts positioned at said knives to grip the severed tops and carry them rearwardly therefrom.

3. A beet topping device for beet harvesters comprising: a pair of vertically adjustable, spaced-apart scoops for lifting the foliage at each side of the beets; a link member hinged to each scoop and extending rearwardly therefrom; a beet engaging runner hinged to the rear extremity of each of said links, said runners being free to rise and fall in accord with the height of the beets in the ground; coacting topping knives carried by said runners and positioned to top the beets passing therebetween; and means for varying the relative heights of said knives and said runners in accordance with the amount of separation of said runners.

4. A beet topping device for preceding the beet lifting plows of a beet harvester comprisng: a supporting member; a forward arch bar secured to and extending downward from said member at each side thereof; a vertically movable rearward arch bar extending downward at each side of said member rearwardly of the forward arch bar; top-lifting members secured on the lower extremities of said forward arch bar; links hinged to said top-lifting members and extending rearwardly therefrom; knife supporting runners carried on the lower extremities of said rearward arch bar, said links being hingedly connected to said runners; and topping knives carried by said runners and positioned to cut the top from the beets passing therebetween.

5. A beet topping device for preceding the beet lifting plows of a beet harvester comprising: a supporting member; a forward arch bar secured to and extending downward from said member at each side thereof; a vertically movable rearward arch bar extending downward at each side of said member rearwardly of the forward arch bar; top-lifting members secured on the lower extremities of said forward arch bar; links hinged to said top-lifting members and extending rearwardly therefrom; knife supporting runners carried on the lower extremities of said rearward arch bar, said links being hingedly connected to said runners; topping knives carried by said runners and positioned to cut the top from the beets passing therebetween; and a counterweight mechanism for supporting a portion of the weight of the rearward arch bar and its connected mechanism, the remainder of the weight being supported by the contact between a beet and said runners.

6. A beet topping device for preceding the beet lifting plows of a beet harvester comprising: a supporting member; a forward arch bar secured to and extending downward from said member at each side thereof; a vertically movable rearward arch bar extending downward at each side of said member rearwardly of the forward arch bar; top-lifting members secured on the lower extremities of said forward arch bar; links hinged to said top-lifting members and extending rearwardly therefrom; knife supporting runners carried on the lower extremities of said rearward bar, said links being hingedly connected to said runners; topping knives carried by said runners and positioned to cut the top from the beets passing therebetween; and manually operated means for raising and lowering said supporting member.

7. A beet topping device for preceding the beet lifting plows of a beet harvester comprising: a vertically movable, inverted U-shaped, arch member; runner plates secured on the legs of said arch member to support the latter on the ground; substantially vertical gauge plates positioned between the runner plates in parallel relation and adapted to rest upon the beets; hinged links extending downwardly and outwardly from the gauge plates to the runner plates to support the latter when the former are resting on a beet; spring means for urging the gauge plates toward each other; and beet topping knives carried from the legs of said arch member and positioned to top the beets passing between said gauge plates.

8. A beet topping device for preceding the beet lifting plows of a beet harvester comprising: a vertically movable, inverted U-shaped, arch member; runner plates secured on the legs of said arch member to support the latter on the ground; substantially vertical gauge plates positioned between the runner plates in parallel relation and adapted to rest upon the beets; hinged links extending downwardly and outwardly from the gauge plates to the runner plates to support the latter when the former are resting on a beet; spring means for urging the gauge plates toward each other; beet topping knives carried from the legs of said arch member and positioned to top the beets passing between said gauge plates; and guide members extending forwardly from said gauge plates to guide the foliage of the beets therebetween.

9. A beet topping device for preceding the beet lifting plows of a beet harvester comprising: a vertically movable, inverted U-shaped, arch member; runner plates secured on the legs of said arch member to support the latter on the ground; substantially vertical gauge plates positioned between the runner plates in parallel relation and adapted to rest upon the beets; hinged links extending downwardly and outwardly from the gauge plates to the runner plates to support the latter when the former are resting on a beet; spring means for urging the gauge plates toward each other; beet topping knives carried from the legs of said arch member and positioned to top the beet passing between said gauge plates; and counterbalancing means for supporting a portion of the weight of said arch member the remainder of the weight being transmitted to the beets through said gauge plates.

10. A beet topping device for preceding the beet lifting plows of a beet harvester comprising: a vertically movable, inverted U-shaped, arch member; runner plates secured on the legs of said arch member to support the latter on the ground; substantially vertical gauge plates positioned between the runner plates in parallel relation and adapted to rest upon the beets; a pair of lower hinged links extending from the lower portion of each gauge plate to the inner portion of the adjacent runner plate; a pair of upper hinged links extending from the upper portion of each gauge plate to the outer portion of each runner, so that when said gauge plates are urged apart the runners will be forced downwardly; spring means resisting separation of said runners; and beet topping knives supported by said arch member for severing the tops from said beets as they pass from beneath said gauge plates.

11. A beet topping device for preceding the beet lifting plows of a beet harvester comprising: a vertically movable, inverted U-shaped, arch member; runner plates secured on the legs of said arch member to support the latter on the ground; substantially vertical gauge plates positioned between the runner plates in parallel relation and adapted to rest upon the beets; a pair of lower hinged links extending from the lower portion of each gauge plate to the inner portion of the adjacent runner plate; a pair of upper hinged links extending from the upper portion of each gauge plate to the outer portion of each runner, so that when said gauge plates are urged apart the runners will be forced downwardly; spring means resisting separation of said runners; beet topping knives supported by said arch member for severing the tops from said beets as they pass from beneath said gauge plates; and means for gathering and elevating the severed tops from said knives.

LESTER A. BEATTY.